Patented Oct. 4, 1949

2,483,510

UNITED STATES PATENT OFFICE 2,483,510

COMPOSITION FOR DIP COATING SOLUTION AND DIP PROCESS FOR COLORING ZINC

Jesse Edwin Stareck, Birmingham, Mich., assignor to United Chromium, Incorporated, New York, N. Y., a corporation of Delaware No Drawing. Application April 14, 1945, Serial No. 588,423

8 Claims. (Cl. 148—6.21)

This invention relates to compositions for dips, and dip processes, for coloring zinc, and provides improvements therein.

Black, adherent, corrosion resistant, surface conversion coatings on zinc, obtainable by dipping treatment are greatly desired by industry. Coatings heretofore produced by dipping methods have generally lacked adherence, do not have good corrosion resistance and do have as deep and lively a black color as desired.

The fortuitous use, in a chromate solution in which surface conversion coatings were being produced on zinc plated articles, of a thermal coil which had been used in a silver plating solution, has led to an unusual and important discovery. Olive drab coatings were being obtained in a chromate solution, when unexpectedly and unexplainably black coatings of a deep tone, good luster and unusual adherence properties were obtained. There was in being before me the ideal of workers in this art, but the result could not then be explained. On recurrence of the phenomenon, I set to work to discover the cause and after considerable study and work found that the result was caused by the presence of a silver salt in the chromate solution which had leached out of the thermal coil which had previously been used in the silver plating solution.

The present invention provides a novel process and novel compositions for producing deep tone black surface conversion coatings on zinc, having good luster, superior corrosion resistance and good adherence. The coatings do not peel or flake when the metal on which the coating is applied is sharply bent, and will withstand piercing and forming operations. The invention provides the only known dip composition and process for directly producing black surface conversion coatings on zinc which have good corrosion resistance. The present invention further provides a process which acts with good speed to produce the surface conversion coatings.

According to the present invention the dip solution and composition consists essentially of a chromate radical from hexavalent chromium compounds, an auxiliary or activating acid radical and silver ion. Other compounds may be included in the solution and composition for special purposes.

Various chromate solutions for forming surface conversion coatings on zinc are known, and tests with numbers of these solutions to which a soluble silver salt was added showed that the benefits of the present invention are obtained. A common characteristic of these prior art chromate dip solutions is that they contain hexavalent chromium radicals, obtained from dissolving chromates, dichromates and chromic acid, and mixtures thereof, and an auxiliary or activating acid radical. As auxiliary or activating acid radicals in chromate dip solutions, there have become known, sulphate radical, nitrate radical, and fluoride radical. Chloride radical, which has been mentioned by the prior art, has been subsequently judged unsuitable. Chloride radical should not be used as an auxiliary acid radical in the present invention, and the presence of chlorides should be excluded or held to a very small amount, as it forms a very insoluble compound with silver.

Silver ion may be obtained by dissolving any of the silver compounds except the most insoluble. In the presence of a large amount of chromate, silver will form silver chromate, which has limited solubility, on the order of a few tenths of a gram per liter. Ordinarily silver nitrate is used as being the most available, but many other compounds of silver may also be used, such as, for example, the acetate, sulphate, carbonate, citrate, silicofluoride, tartrate, tungstate, and oxide. The silver compound is usually added in an amount in excess of that corresponding to the amount of silver ion which will remain in the chromate solution; in this way precipitation by small amounts of chlorides in the solution will be compensated and also an automatic source for replenishment of silver ions lost in the process is provided.

According to my view the silver ion in the dip solution increases the tendency of the zinc to go into solution, i. e. to react with the chromate ions of the solution and thereby form the surface conversion coating. Further, according to my view, the surface metal, in the presence of the dip solution according to the present invention, acts to reduce some of the hexavalent chromium to trivalent chromium, and these different constituents react on one another to form on the surface of the metal, basic chromium chromate

[Cr(OH)$_2$]$_2$CrO$_4$

The composition according to the present invention, consists essentially of the ingredients making up any known chromate dip solution for forming surface conversion coatings on zinc, with the addition of a relatively small amount of a soluble silver compound.

The preferred composition consists essentially of a water soluble hexavalent chromium compound (as chromic acid, or a soluble chromate or dichromate), a compound which dissolves in water to yield an auxiliary or activating acid radical (as a sulphate or a fluoride, or a complex fluoride such as borofluoride, silicofluoride, or alumino-fluoride, etc.), and a compound which dissolves in water to yield a short chain, saturated aliphatic monobasic acid radical (as a formate, acetate, propionate, butyrate, or chloroacetate, or aminoacetate, etc.) with the addition of a relatively small amount of a water soluble silver compound.

An example of the preferred composition, giving the optimum and ranges of the ingredients, follows:

EXAMPLE I

|  | Percent by Weight | | Concentration in Solution, g./l. | |
| --- | --- | --- | --- | --- |
|  | Optimum | Range | Optimum | Range |
| $Cr^{VI}$ | 22.2 | 11 -33 | 65 | 30-90 |
| $SO_4^-$ | 23.4 | 12 -35 | 68 | 34-101 |
| $C_2H_3O_2^-$ | 15.0 | 8 -22 | 43 | 22- 65 |
| $Ag^+$ | 0.5 | 0.02- 0.7 | (1) | (1) |

[1] Few tenths g./l.

The pH range of the solution is 0.5 to 3.0 (optimum 0.8 to 2.5).

*Typical make-up ingredients*

|  | Optimum | Range |
| --- | --- | --- |
| $CrO_3$ | 43.6 | 22—66 |
| $Na_2SO_4$ | 34.8 | 18—53 |
| $NaC_2H_3O_2$ | 20.9 | 10—32 |
| $AgNO_3$ | 0.7 | 0.03—1 |

A second example, which is also a composition heretofore in use, with the addition of a silver compound according to the present invention, follows:

EXAMPLE II

| Typical Make-up Ingredients | In Solution |
| --- | --- |
| 25-200 g./l. $CrO_3$ | $Cr^{VI}$  13-104 g./l. |
| 1-50 cc. conc. $H_2SO_4$ | $SO_4^-$  2- 85 g./l. |
| 0.2-2.0 g./l. $AgNO_3$ | $Ag^+$  Few tenths g./l. |
|  | pH  About 1. |

The role of the acetate radical (or equivalent) is to add luster to the surface conversion coating, and this I attribute to a buffering action at the interface between the metal and the solution, and a slowing down of the activating or auxiliary acid radical ($SO_4$).

The dip is usually made by adding water to 1 to 3 pounds of the aforesaid compositions to make a gallon of solution.

Temperature has an effect on the potential of the metal on which the surface conversion coating is being formed, in contact with the solution, increasing temperature making the metal more active. Good results are obtained with cold or warm solutions.

Articles are immersed until the coating has developed over the surface thereof; ordinarily the time of immersion is from ½ to 5 minutes. After immersion, the coated articles are rinsed in water and dried in a suitable manner, as by warm air or centrifuging.

To obtain good black surface conversion coatings on zinc base die castings, they should be pre-treated for about 2 minutes in a hot caustic soda solution (16–24 oz./gal.) after being cleaned by usual methods, and then rinsed before being immersed in the solution for forming the surface conversion coating. No such pre-treatment, however, is required for zinc-plated and galvanized metals, or pure zinc.

What is claimed is:

1. A dip composition for producing black surface conversion coatings on zinc consisting essentially of hexavalent chromium, an activating or auxiliary acid radical, or radicals, of the group consisting of sulphate radicals and fluoride radicals, and a soluble silver compound.

2. A dip composition according to claim 1, further including a short-chain saturated aliphatic monobasic salt.

3. A dip composition according to claim 2, wherein the hexavalent chromium is 11 to 33 parts by weight, the activating acid radical 12 to 35 parts $SO_4$ basis by weight and the short-chain saturated aliphatic monobasic salt 8 to 22 parts $C_2H_3O_2$ basis by weight.

4. A dip composition, according to claim 1, wherein the hexavalent chromium is 11 to 33 parts by weight, and the activating acid radical 12 to 35 parts $SO_4$ basis by weight.

5. A method of forming black surface conversion coatings on zinc, consisting in dipping the zinc in a water solution consisting essentially of hexavalent chromium, an activating acid radical of the group consisting of sulphate radicals and fluoride radicals, and silver ion, and then removing the zinc from the solution.

6. A method of forming black surface conversion coatings on zinc, according to claim 5, wherein the dip solution further contains a short-chain saturated aliphatic monobasic salt.

7. A method of forming black surface conversion coatings on zinc, consisting in dipping the metal in a water solution consisting essentially of 30 to 90 g./l. hexavalent chromium, 34 to 101 g./l. $SO_4$, 22 to 65 g./l. of $C_2H_3O_2$ and a few tenths of a gram per liter of silver ion, and then removing the zinc from the solution.

8. A method of forming black surface conversion coatings on zinc, according to claim 5, wherein the solution has a pH from 0.8 to 2.5.

JESSE EDWIN STARECK.

REFERENCES CITED

The following references are of record in the file of this patent:

UNITED STATES PATENTS

| Number | Name | Date |
| --- | --- | --- |
| 1,480,869 | Thomas | Jan. 15, 1924 |
| 1,782,092 | Gray et al. | Nov. 18, 1930 |
| 1,988,012 | Mason | Jan. 15, 1935 |
| 2,213,263 | Thompson et al. | Sept. 3, 1940 |
| 2,224,245 | Allen | Dec. 10, 1940 |
| 2,393,664 | Thomas et al. | Jan. 29, 1946 |

FOREIGN PATENTS

| Number | Country | Date |
| --- | --- | --- |
| 442,766 | Germany | Apr. 6, 1927 |